(12) United States Patent
Joseph et al.

(10) Patent No.: US 9,076,810 B2
(45) Date of Patent: Jul. 7, 2015

(54) SCALING OF BIPOLAR TRANSISTORS

(71) Applicant: International Business Machines Corporation, Armonk, NY (US)

(72) Inventors: Alvin J. Joseph, Williston, VT (US); Ramana M. Malladi, Williston, VT (US); James A. Slinkman, Montpelier, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/508,011

(22) Filed: Oct. 7, 2014

(65) Prior Publication Data
US 2015/0024570 A1      Jan. 22, 2015

Related U.S. Application Data

(62) Division of application No. 13/195,155, filed on Aug. 1, 2011, now Pat. No. 8,872,236, which is a division of application No. 12/493,383, filed on Jun. 29, 2009, now Pat. No. 8,020,128.

(51) Int. Cl.
*H01L 21/331* (2006.01)
*H01L 29/66* (2006.01)
(Continued)

(52) U.S. Cl.
CPC ...... *H01L 29/66272* (2013.01); *G06F 17/5009* (2013.01); *G06F 17/5036* (2013.01);
(Continued)

(58) Field of Classification Search
CPC ............ H01L 29/0615; H01L 29/7393; H01L 27/0647; H01L 27/105; H01L 29/0684; H01L 29/66242; H01L 29/66325; H01L 29/78; H01L 29/785; H01L 21/02104; H01L 21/02532; H01L 21/02664; H01L 21/28097
USPC .......... 257/47, 197, 205, 273, 361–362, 370, 257/378, E51.004, E31.069; 438/343, 318
See application file for complete search history.

(56) References Cited

U.S. PATENT DOCUMENTS

| 5,343,052 A | 8/1994 | Oohata et al. |
| 5,789,799 A | 8/1998 | Voinigescu et al. |

(Continued)

FOREIGN PATENT DOCUMENTS

| JP | 04209551 | 7/1992 |
| JP | 5048078 | 2/1993 |

(Continued)

OTHER PUBLICATIONS

Extended European Search Report dated Jul. 7, 2014 from European Patent Office; Application No. 10800212.2-1552/2449580 PCT/US2010037149; 7 Pages.

(Continued)

*Primary Examiner* — Mark A Laurenzi
(74) *Attorney, Agent, or Firm* — Schmeiser, Olsen & Watts; Anthony J. Canale

(57) ABSTRACT

Bipolar transistor structures, methods of designing and fabricating bipolar transistors, methods of designing circuits having bipolar transistors. The method of designing the bipolar transistor includes: selecting an initial design of a bipolar transistor; scaling the initial design of the bipolar transistor to generate a scaled design of the bipolar transistor; determining if stress compensation of the scaled design of the bipolar transistor is required based on dimensions of an emitter of the bipolar transistor after the scaling; and if stress compensation of the scaled design of the bipolar transistor is required then adjusting a layout of a trench isolation layout level of the scaled design relative to a layout of an emitter layout level of the scaled design to generate a stress compensated scaled design of the bipolar transistor.

16 Claims, 14 Drawing Sheets

(51) Int. Cl.
*G06F 17/50* (2006.01)
*H01L 21/8249* (2006.01)
*H01L 29/732* (2006.01)
*H01L 21/762* (2006.01)
*H01L 21/02* (2006.01)
*H01L 21/311* (2006.01)
*H01L 27/02* (2006.01)

(52) U.S. Cl.
CPC ........ *G06F17/5068* (2013.01); *G06F 2217/12* (2013.01); *H01L 21/8249* (2013.01); *H01L 29/7322* (2013.01); *H01L 21/76229* (2013.01); *H01L 21/76224* (2013.01); *H01L 21/02532* (2013.01); *H01L 21/02595* (2013.01); *H01L 21/31111* (2013.01); *H01L 27/0207* (2013.01); *H01L 21/76232* (2013.01)

(56) References Cited

U.S. PATENT DOCUMENTS

| | | | |
|---|---|---|---|
| 5,920,111 | A | 7/1999 | Wong et al. |
| 5,986,324 | A | 11/1999 | Adlerstein et al. |
| 6,303,973 | B1 | 10/2001 | Nakagawa et al. |
| 6,429,502 | B1 | 8/2002 | Librizzi et al. |
| 6,943,387 | B2 | 9/2005 | Ohbu et al. |
| 8,020,128 | B2 | 9/2011 | Joseph et al. |
| 8,872,236 | B2 | 10/2014 | Joseph et al. |
| 2003/0201517 | A1 | 10/2003 | Dunn et al. |
| 2005/0225910 | A1 | 10/2005 | Stricker et al. |
| 2006/0170004 | A1 | 8/2006 | Toyoda et al. |
| 2007/0105301 | A1 | 5/2007 | Chen et al. |
| 2007/0204250 | A1 | 8/2007 | Moroz et al. |
| 2008/0067631 | A1 | 3/2008 | Chidambarrao et al. |
| 2008/0079066 | A1 | 4/2008 | Hamaguchi et al. |
| 2008/0121930 | A1 | 5/2008 | Adam et al. |
| 2010/0327280 | A1 | 12/2010 | Joseph et al. |
| 2011/0278570 | A1 | 11/2011 | Joseph et al. |

FOREIGN PATENT DOCUMENTS

| | | |
|---|---|---|
| JP | 11265953 | 9/1998 |
| JP | 2004274430 | 9/2004 |
| JP | 2009076518 | 4/2009 |
| TW | 497263 | 8/2002 |
| WO | 03046948 | 6/2003 |
| WO | 2008134105 | 11/2008 |

OTHER PUBLICATIONS

Malladi et al.; Non-Standard Geometry Scaling Originated by Extrinsic Stress in SiGe HBTs; 4 pages, 2008.

Malladi et al.; "Geometry Scaling Issues Originated by Extrinsic Stress in SiGe HBTs"; Presented Oct. 13-15, 2008 at the Bipolar/BiCMOS Circuits and Technology Meeting, 2008 and published in the BCTM 2008 IEEE Oct. 31, 2008. pp. 145-148.

Venegas et al., "Impact of Lateral Scaling on Low Frequency Noise of 200 Ghz SiGe:C HBTs"; Dec. 2005, American Institute of Physics. pp. 253-257.

Joseph et al.; "The Effects of Scaling and Bias Configuration on Operating-Voltage Constraints in SiGe HBTs for Mixed-Signal Circuits", Jul. 2007, IEEE vol. 54, No. 7, p. 1605.

Joseph et al.; "Impact of Scaling on the Inverse-Mode Operation of SiGe HBTs", Jun. 2007, IEEE vol. 54, No. 6, p. 1492.

Freeman et al.; "Scaling of SiGe Heterojunction Bipolar Transistors", Sep. 2005, IEEE vol. 93, No. 9, p. 1522.

Office Action (Mail Date Feb. 6, 2014) for U.S. Appl. No. 13/195,155, filed Aug. 1, 2011; Confirmation No. 1416.

Amendment filed Apr. 30, 2014 in response to Office Action (Mail Date Feb. 6, 2014) for U.S. Appl. No. 13/195,155, filed Aug. 1, 2011; Confirmation No. 1416.

Notice of Allowance (Mail Date Jun. 26, 2014) for U.S. Appl. No. 13/195,155, filed Aug. 1, 2011; Confirmation No. 1416.

Office Action (Mail Date Dec. 17, 2010) for U.S. Appl. No. 12/493,383, filed Jun. 29, 2009; Confirmation No. 9265.

Admendment filed Feb. 23, 2011 in response to Office Action (Mail Date Dec. 17, 2010) U.S. Appl. No. 12/493,383, filed Jun. 29, 2009; Confirmation No. 9265.

Notice of Allowance (Mail Date May 9, 2011) for U.S. Appl. No. 12/493,383, filed Jun. 29, 2009; Confirmation No. 9265.

Response to extended European search report dated Jul. 7, 2014; Application No. EP10800212.2; Jan. 22, 2015; 6 pages.

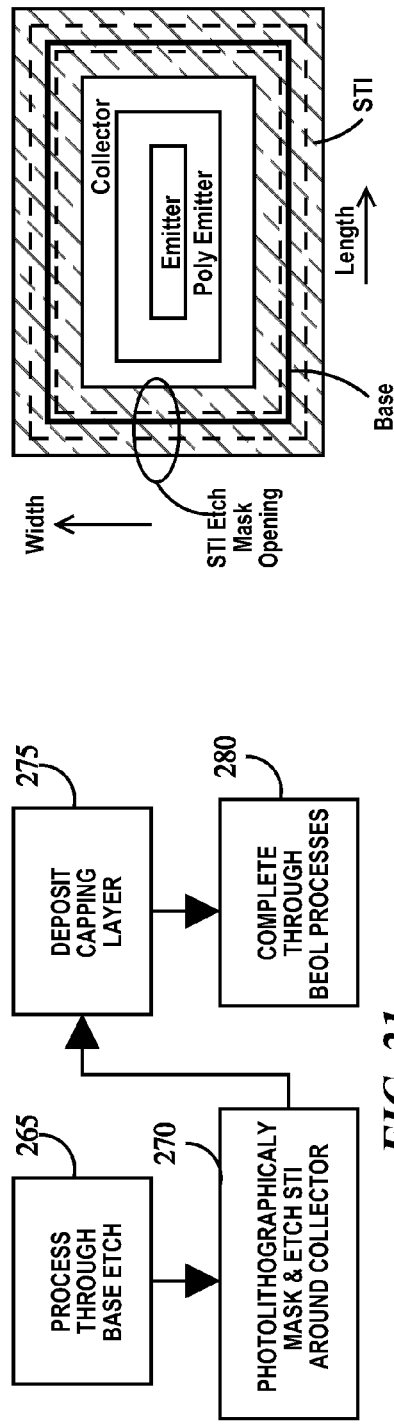
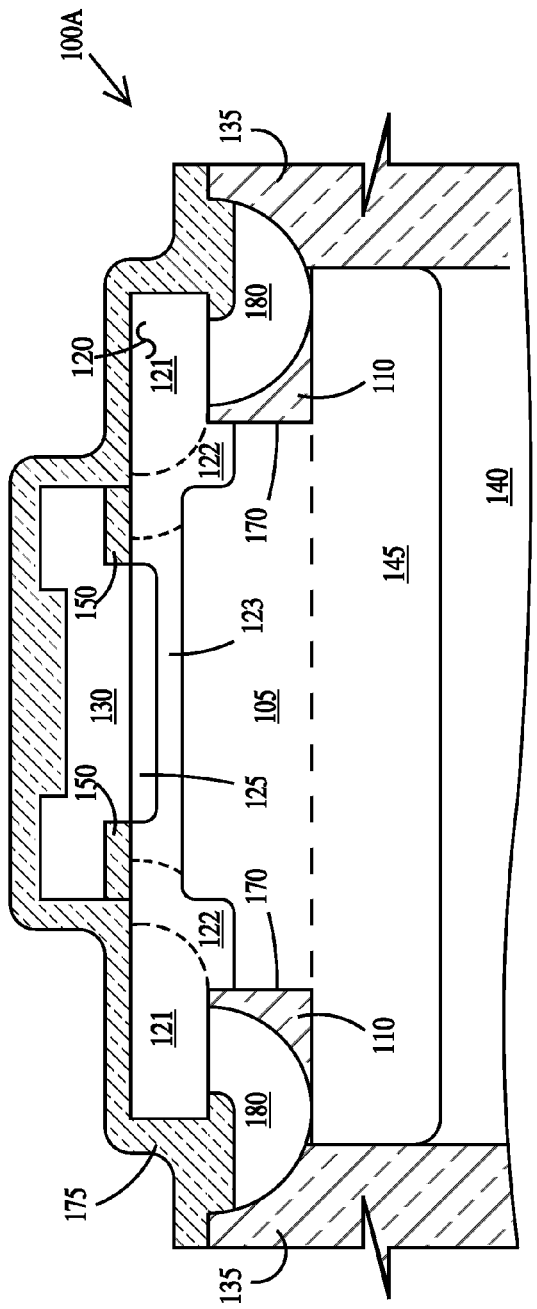
FIG. 19
FIG. 20
FIG. 21

SCALING OF BIPOLAR TRANSISTORS

RELATED APPLICATIONS

This application is a division of U.S. patent application Ser. No. 13/195,155 filed Aug. 1, 2011 which is a division of U.S. patent application Ser. No. 12/493,383 filed on Jun. 29, 2009, now U.S. Pat. No. 8,020,128, issued Sep. 13, 2011.

FIELD OF THE INVENTION

The present invention relates to the field of bipolar transistors; more specifically, it relates methods of designing, modeling, and fabricating bipolar transistors and bipolar transistor structures.

BACKGROUND OF THE INVENTION

One method for improving bipolar transistor performance is to reduce the geometry of the transistors by scaling. However, as the size of bipolar transistors has decreased, a point has been reached where changes in performance are different than expected. Accordingly, there exists a need in the art to mitigate the deficiencies and limitations described hereinabove.

SUMMARY OF THE INVENTION

A first aspect of the present invention is a method, comprising: selecting an initial design of a bipolar transistor; scaling the initial design of the bipolar transistor to generate a scaled design of the bipolar transistor; determining if stress compensation of the scaled design of the bipolar transistor is required based on dimensions of an emitter of the bipolar transistor after the scaling; and if stress compensation of the scaled design of the bipolar transistor is required then adjusting a layout of a trench isolation layout level of the scaled design relative to a layout of an emitter layout level of the scaled design to generate a stress compensated scaled design of the bipolar transistor.

A second aspect of the present invention is a method, comprising: (a) selecting a circuit design; (b) using one or more computer processors, extracting layout levels and corresponding layout parameters of bipolar transistors from the circuit design; (c) using the one or more computer processors, determining device parameters of the bipolar transistors from the layout parameters; (d) using the one or more computer processors, performing a circuit simulation of the circuit design; (e) determining, based on results of the simulation, if the circuit design meets predetermined performance goals; (f) if the performance goals are not met, then for at least one of the bipolar transistors adjusting a layout of a trench isolation layout level of the at least one bipolar transistor relative to a layout of an emitter layout level of the at least one bipolar transistor; and (g) repeating steps (b) through (f) until the performance goals are met or a predetermined number of times.

A third aspect of the present invention is a method, comprising: forming a trench in a substrate, and filling the trench with dielectric material to form trench isolation defining a perimeter of a collector in the substrate; forming a base on the collector; forming an emitter in the base; removing all or a portion of the dielectric material from the trench; and forming a dielectric capping layer on exposed regions of the substrate, the base and the emitter and over the trench; the capping layer sealing an upper region of the trench and forming a void around the perimeter of the collector.

A fourth aspect of the present invention is a bipolar transistor, comprising: a trench in a substrate, the trench proximate to a perimeter of a collector in the substrate; a base on the collector; an emitter in the base; and a dielectric capping layer on exposed regions of the substrate, the base and the emitter and extending over the trench; the capping layer sealing but not filling the trench.

A fifth aspect of the present invention is a bipolar transistor, comprising: a dielectric filled trench in a substrate, the dielectric filled trench defining a perimeter of a collector in the substrate, the collector having a dog-bone shaped cross-section in a plane parallel to a top surface of the substrate; a base on the collector; and an emitter in the base.

BRIEF DESCRIPTION OF THE DRAWINGS

The features of the invention are set forth in the appended claims. The invention itself, however, will be best understood by reference to the following detailed description of an illustrative embodiment when read in conjunction with the accompanying drawings, wherein:

FIG. 19 is the similar to FIG. 3, but additional processing according to embodiments of the present invention has been performed;

FIG. 20, is a plan view of a bipolar transistor illustrating a masking layer for practicing step 255 of the method of FIG. 18;

FIG. 21 is a flowchart of a physical method of collector stress relief according to embodiments of the present invention.

DETAILED DESCRIPTION OF THE INVENTION

Geometry scaling of a device (e.g., a bipolar transistor) is defined as generating a design of a second device from a design of a first device by reducing one or more of the length, width, number of fingers, multiplicity, or depth of one or more elements (e.g., collector, base, emitter) of the first device. Unless otherwise noted, the term "device" should be understood to mean a bipolar transistor and the term "scaled device" to mean where the collector and emitter layout dimensions have been scaled from a design of a larger bipolar transistor to generate a design of a smaller bipolar transistor or vice versa. Generally the length of an emitter is greater than a width of the emitter, though the length and width of an emitter could be equal. Layout dimensions are the dimensions of length and width in top and plan views.

A compact model is defined as an approximate analytic model that describes the physics of complex 3-dimensional phenomenon in a less complex 2-dimensional description (embodied in an equation, model or algorithm) and often in a form that is more easily encoded in software and less computer time intensive, but gives substantially the same results as the exact solution to the complex phenomenon. Generally compact models model length and width dimension (i.e., layout geometry dimensions) and depth dimensions (e.g., extension into the substrate) using model parameters specific to the compact model.

Figure 1:
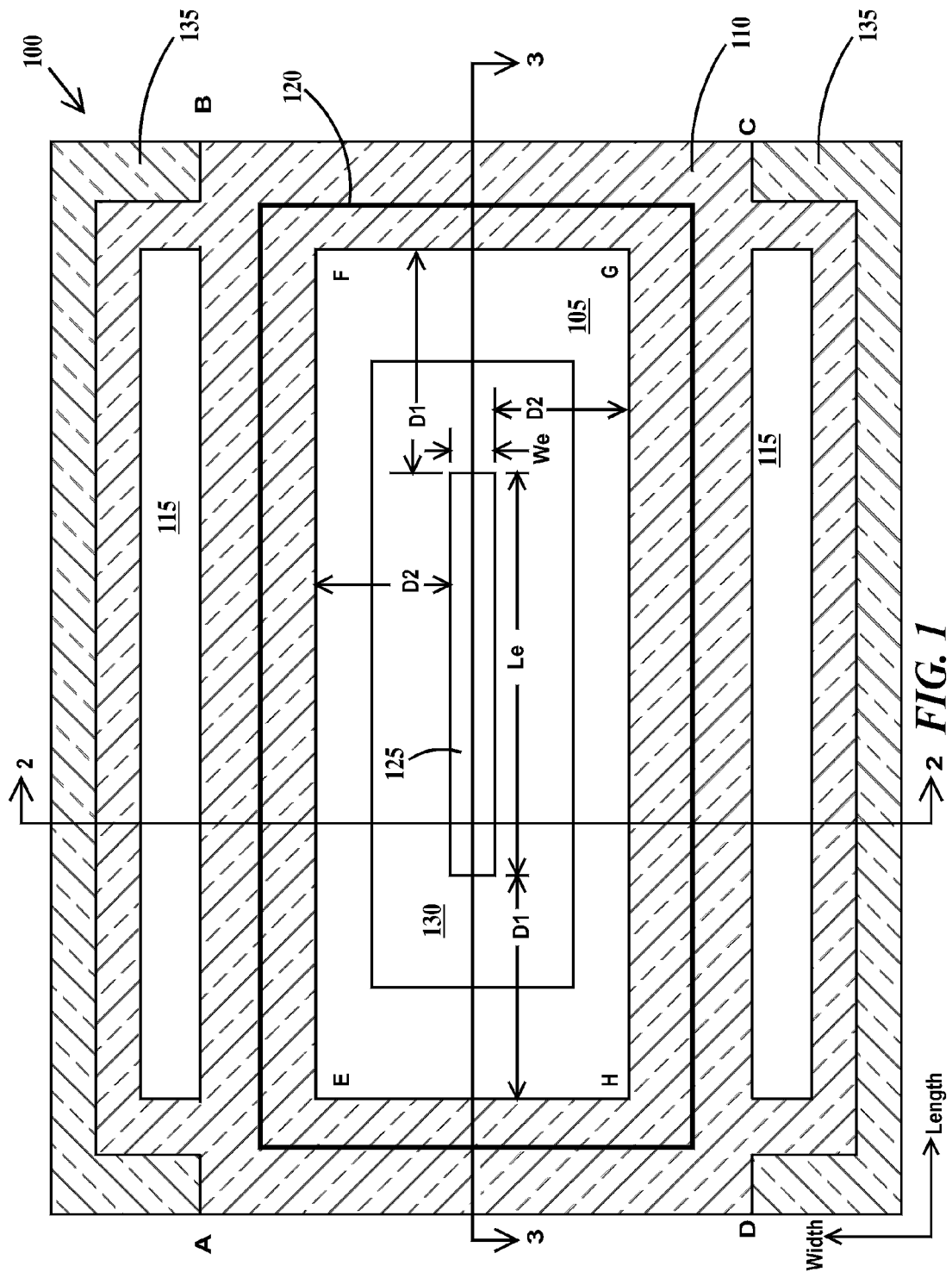
FIG. 1 is a plan/top view of an exemplary bipolar transistor to which the embodiments of the present invention may be applied.

FIG. 1 is a plan/top view of an exemplary bipolar transistor to which the embodiments of the present invention may be applied. In FIG. 1, a bipolar transistor 100 includes a collector 105 defined by shallow trench isolation (STI) 110 formed in a silicon substrate 140 (see FIG. 2). Collector contacts 115 are electrically connected to collector 105 (see FIG. 2). A base 120 (heavy line) is formed over collector 105 and overlaps STI 110. A single crystal emitter 125 is formed on base 120 and a polysilicon emitter layer 130 is formed on emitter 125 and overlapping base 120. Regions of deep trench isolation (DTI) 135 are formed abutting regions of STI 135. STI 110 and DTI 135 are shown crosshatched for clarity. Emitter 125 has a length Le in a lengthwise direction and a width We in a widthwise direction. The lengthwise direction is perpendicular to the widthwise direction. Dimensions of STI 110 which will be discussed infra are defined by vertices A, B, C and D which define sides $\overline{AB}$, $\overline{BC}$, $\overline{CD}$ and $\overline{AD}$ and an area $\overline{ABCD}$. Dimensions of collector 105 which will be discussed infra are defined by vertices E, F, G and H which defines sides $\overline{EF}$, $\overline{FG}$, $\overline{GH}$ and $\overline{EH}$ and an area $\overline{EFGH}$. Two spacings that will be discussed infra include the outer edge of emitter 125 to the inner edge of STI 110 distances D1 in the lengthwise direction and the outer edge of emitter 125 to inner edge of STI 110 distances D2 in the widthwise direction. The length Le of emitter 122 runs parallel to the length Lcc of collector contacts 115.

Figure 2:
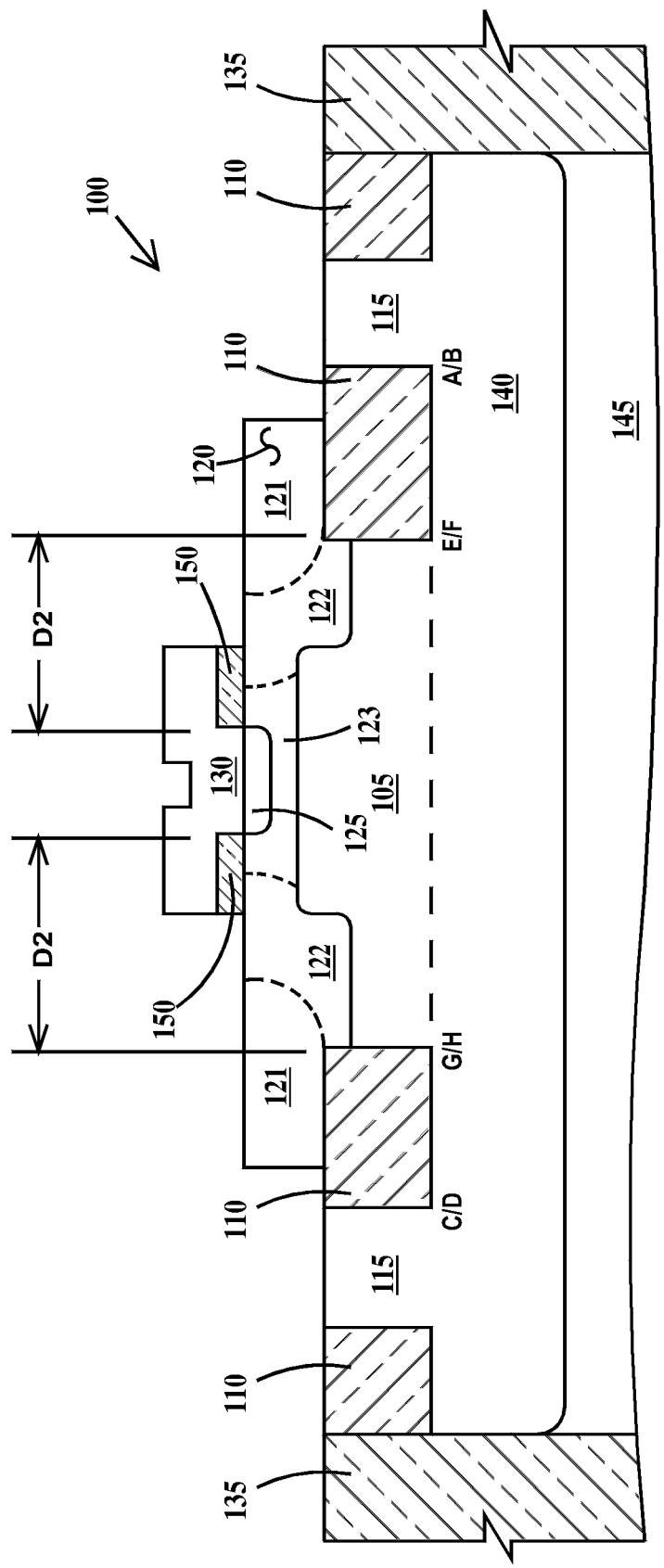
FIG. 2 is a cross-section view through line 2-2 of FIG. 1.
Figure 3:
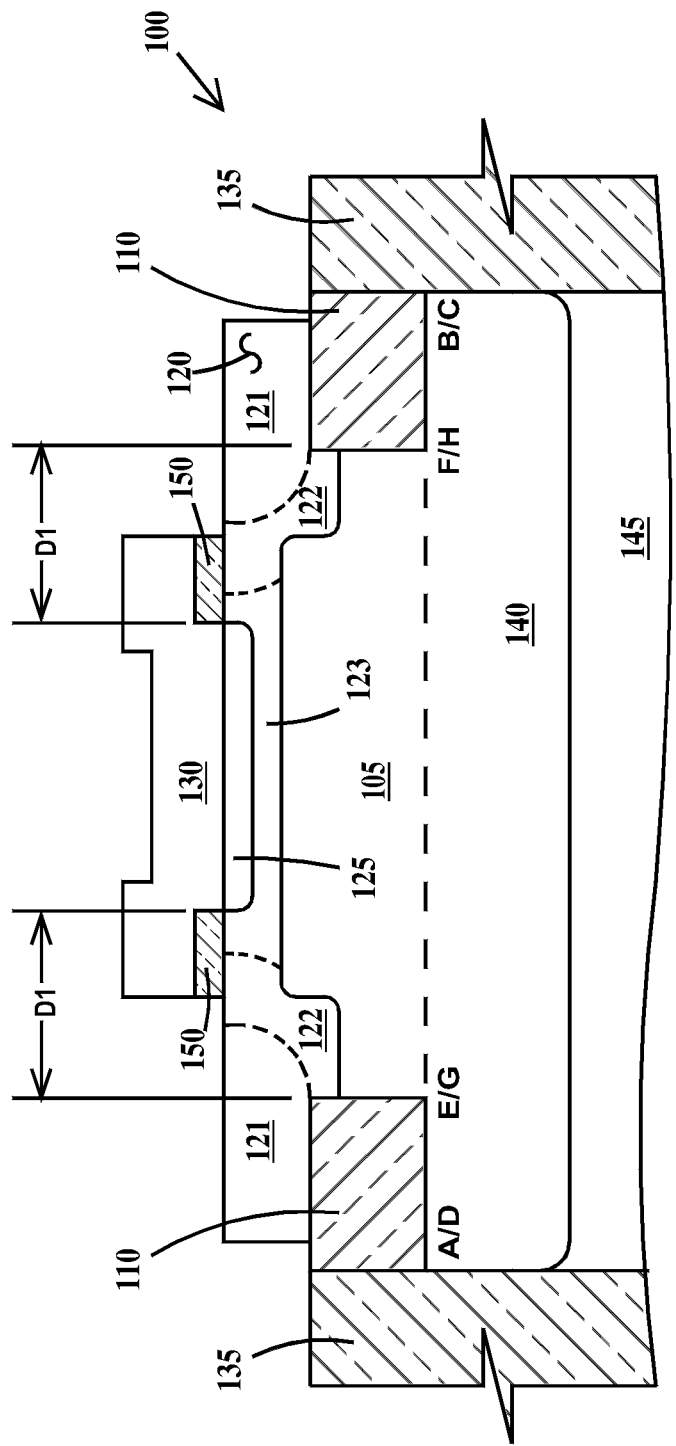
FIG. 3 is a cross-section view through line 3-3 of FIG. 1.

FIG. 2 is a cross-section view through line 2-2 of FIG. 1 and FIG. 3 is a cross-section view through line 3-3 of FIG. 1. In FIGS. 2 and 3, a subcollector 140 is formed in single-crystal silicon substrate 145 and is bounded by DTI 135. Collector 105 is formed in subcollector 140 and is bounded by STI 110. Collector contacts 115 electrically connect to collector 105 through subcollector 140. Base 120 comprises a polysilicon extrinsic base region 121, a single crystal silicon extrinsic base region 122 and a single crystal intrinsic base region 123 in which emitter 125 is formed. A dielectric layer 150 is formed between base 120 and polysilicon emitter layer 130 except over emitter 125. FIG. 2 shows the location of the lines into the plane of the paper defined by the vertices pairs C/D, G/H, E/F and A/B and shows where the distances D2 are measured from. FIG. 3 shows the location of the lines into the plane of the paper defined by the vertices pairs A/D, E/G, F/H and B/C and shows where the distances D1 are measured from.

In one example, bipolar transistor 100 is an NPN transistor and subcollector 140, collector 105 and emitter 125 are doped N-type and the extrinsic base regions 121 and 122 are doped P-type and the intrinsic base region 123 is either undoped or very lightly doped (e.g., less than about 5E15 atm/cm$^3$) P type. In one example, base 120 includes graded layers of SiGe making bipolar transistor 100 a heterojunction bipolar transistor (HJBT). In one example STI 110 is silicon dioxide. In one example, DTI 135 comprises a polysilicon core and a silicon dioxide liner between the polysilicon core and substrate STI 110, subcollector 140 and substrate 145.

A simplified process for forming bipolar transistor 100 of FIGS. 1, 2 and 3 comprises: (1) forming subcollector 140 in substrate 145, (2) growing an epitaxial layer on substrate 145 to form collector 140, (3) forming DTI 135, (4) forming STI 110, (5) forming collector contacts 115, (6) forming a polysilicon base layer which also forms single crystal intrinsic base region 123, (7) doping the intrinsic polysilicon base layer (except in intrinsic base region 123) to form extrinsic base regions 121 and 122, (8) forming a polysilicon emitter layer which also forms the single crystal silicon emitter 125, (9) masking and etching the polysilicon emitter layer to form polysilicon emitter layer 130, and (10) masking and etching the polysilicon base layer to form base 120.

Complementary metal oxide silicon (CMOS) devices comprising N-channel field effect transistors (NFETs) and P-channel field effect transistors (PFETs) may be optionally formed between steps (5) and (6).

Figure 4:
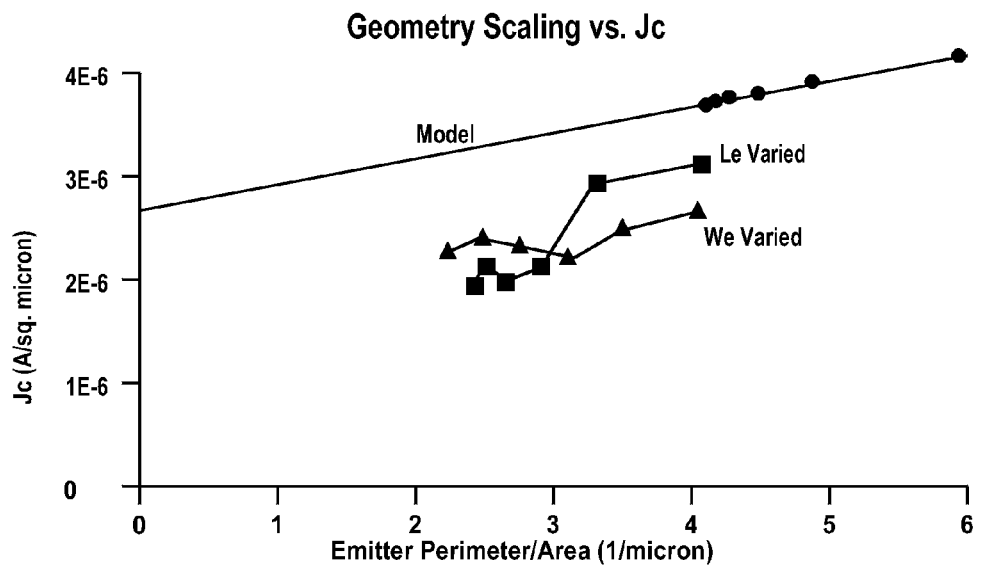
FIG. 4 is a plot of collector current density vs. emitter perimeter to area ratio showing expected values according to a standard bipolar transistor model and measured values for physical bipolar transistors.

FIG. 4 is a plot of collector current density vs. emitter perimeter to area ratio showing expected values according to a standard bipolar transistor model and measured values for physical bipolar transistors. Traditionally, the variation of emitter current as a function of the area and perimeter of the emitter as expressed in equation (1) has been used to scale collector current in bipolar transistors.

$$Ic = Ica \cdot A + Icp \cdot P \qquad (1)$$

where:

Ic is collector current;

Ica is the emitter area component of the collector current;

Icp is the emitter perimeter component of the collector current;

A is the emitter area (Le×We in FIG. 1); and

P is the emitter perimeter (2Le+2We in FIG. 1).

Dividing equation (1) by A gives equation (2):

$$Jc = Ica + Icp(P/A) \qquad (2)$$

where Jc is collector current density.

A plot of Jc as a function of P/A is a straight line having a slope Icp/A and an intercept Ica/A as shown by the curve labeled "Model" in FIG. 4. Equation (1) may be considered a scaling equation in a compact model.

However, equation (1) has been found not to hold for scaled devices having very small emitters as illustrated by curves "Le Varied" and "We Varied" of FIG. 4. For the curve "Le Varied" emitter length Le was about 10 um and emitter width We varied from about 0.4 um to about 0.9 um. For the "We Varied" emitter width We was about 0.8 um and emitter length Le varied from about 1.2 um to about 25 um. For all three curves, Vbe was about 0.7 v.

Figures 5A, 5B:
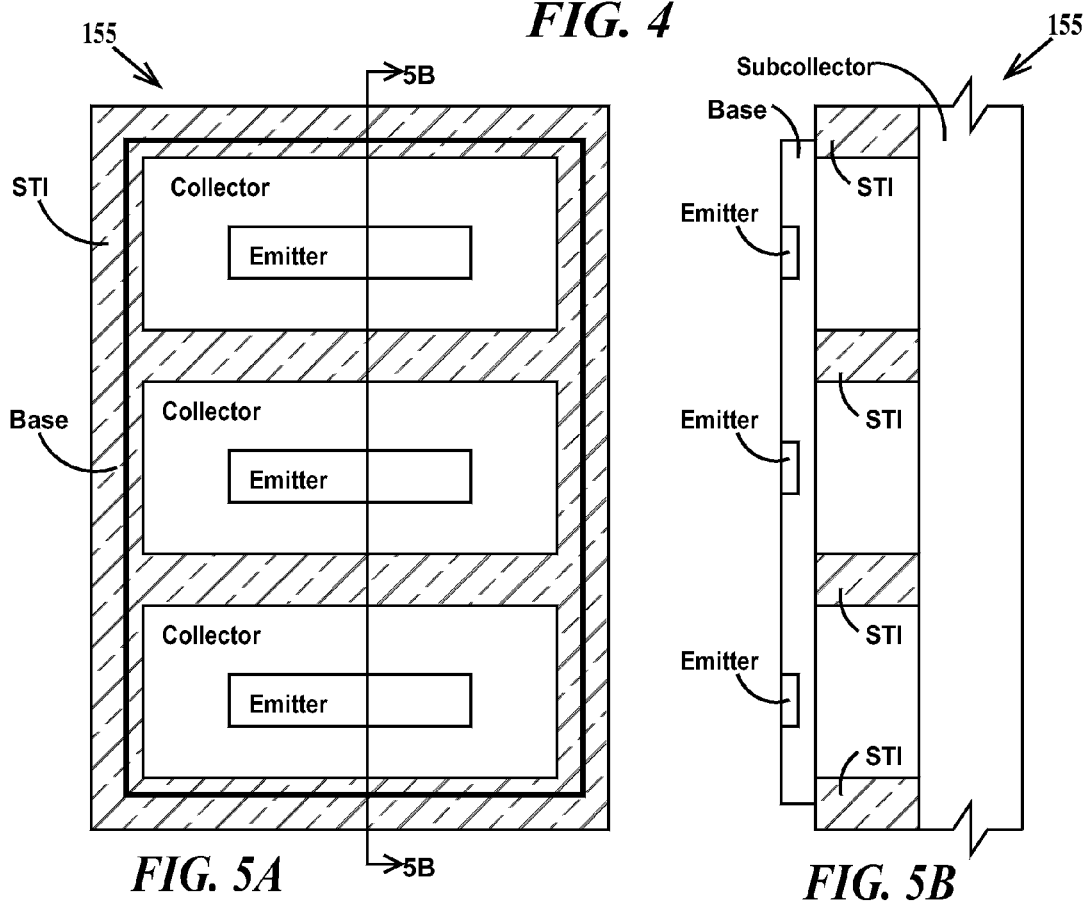
FIG. 5A is a plan view of an exemplary multi-emitter bipolar transistor and FIG. 5B is a cross-section through a fabricated device through line 5B-5B of FIG. 5A.

FIG. 5A is a plan view of an exemplary multi-emitter bipolar transistor and FIG. 5B is a cross-section through a fabricated device through line 5B-5B of FIG. 5A. In FIG. 5A, the layout of bipolar transistor 155 includes the STI/collector design level (which may be denoted RX), the layout of the base design level (heavy line and which may be denoted PB) and the layout of the emitter design level (which may be denoted EX) are illustrated. In FIG. 5A, the STI is cross-hatched for clarity. From FIG. 5B is it can be seen that the bipolar transistor 155 has a common subcollector and base with separate collectors and emitters.

Figure 6:
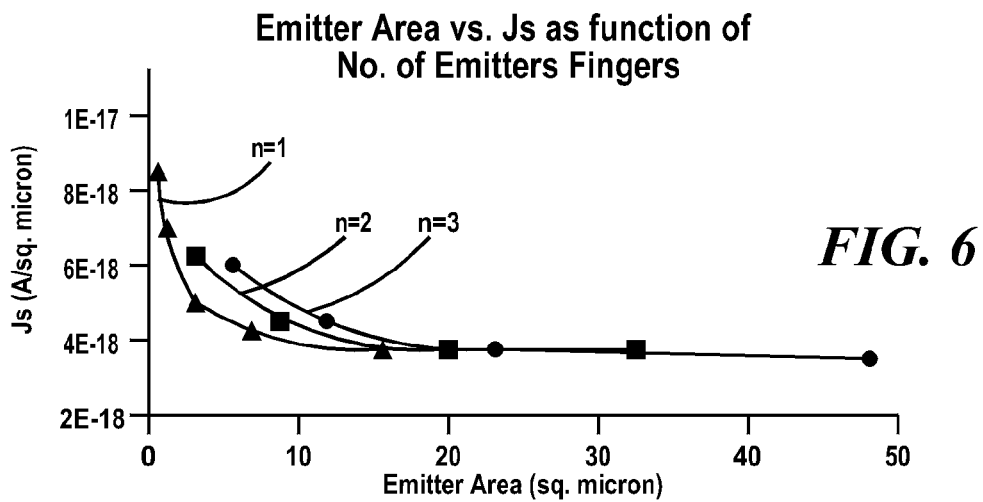
FIG. 6 is a plot of measured values of collector current density at saturation vs. emitter area for physical bipolar transistors.

FIG. 6 is a plot of measured values of collector current density at saturation vs. emitter area for physical bipolar transistors. The collector current density at saturation Js is related to the collector current density Jc by equation (3):

$$Jc = Js \exp\left(\frac{qV_{BE}}{kT}\right) \qquad (3)$$

where:

q is the electron charge;

Vbe is the voltage between the emitter and base;

k is Boltzmann's constant; and

T is the temperature of the device.

In FIG. 6, the effect of the number of emitters "n" on Js is illustrated. Scaled devices with higher numbers of emitters, but otherwise the same emitter area exhibits higher Js. For example, a device having two 0.8 um by 5 um emitters has a higher Js than a device having one 0.8 um by 10 um emitter. FIG. 6 indicates the scaling error of equation (1) holds not only for single emitter transistors, but also for multi-emitter transistors.

Figure 7:
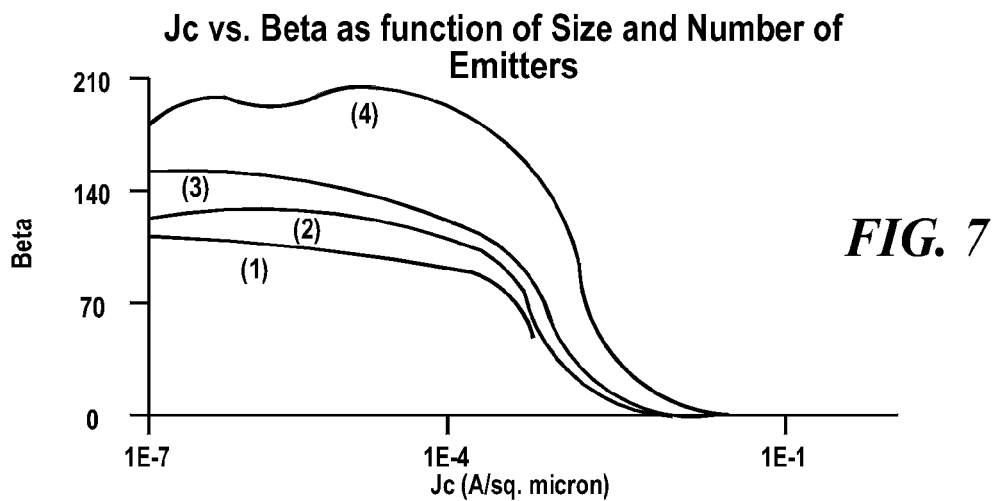
FIG. 7 is a plot of measured values of beta vs. collector current density for physical bipolar transistors.

FIG. 7 is a plot of measured values of beta ($\beta$) vs. collector current density for physical bipolar transistors. In FIG. 7, $\beta$ vs. Jc is plotted for four scaled devices (curves, 1, 2, 3 and 4). Curve 1 is for a device having Le=20 um, We=0.8 um and n (number of emitters)=3. Curve 2 is for a device having Le=10 um, We=0.8 um and n=3. Curve 3 is for a device having Le=5 um, We=0.8 um and n=1. Curve 4 is for a device having Le=1.2 um, We=0.8 um and n=1. FIG. 7, shows smaller devices exhibit higher $\beta$ than would normally be expected. $\beta$ is defined as the collector current divided by the base current as shown in equation (4):

$$\beta = Ic/Ib \qquad (4)$$

where:

$\beta$=the gain of the transistor;

Ic is the collector current; and

Ib is the base current.

Figure 8:
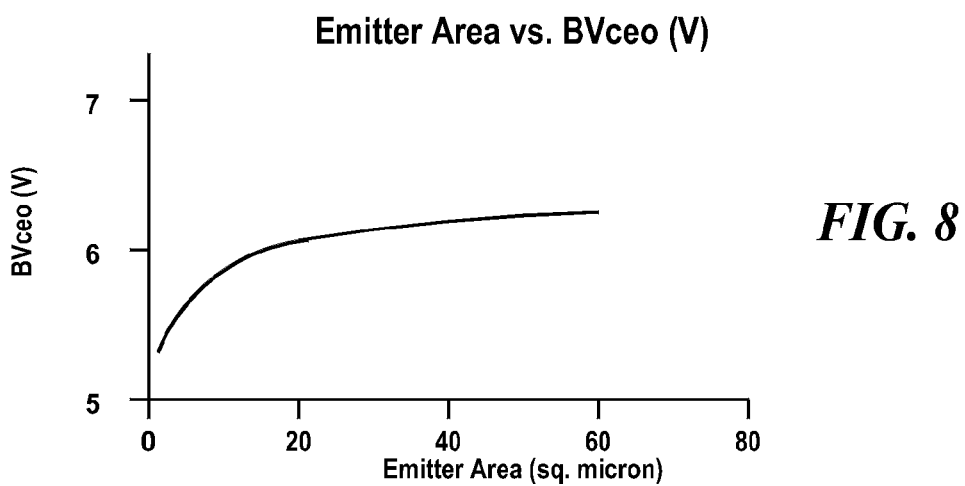
FIG. 8 is a plot of measured values of collector to emitter breakdown voltage vs. emitter area for physical bipolar transistors.

FIG. 8 is a plot of measured values of collector to emitter breakdown voltage vs. emitter area for physical bipolar transistors. FIG. 8, shows in scaled devices, the breakdown voltage is smaller than expected from equation (5):

$$BVceo \propto \beta^{-1/m} \qquad (5)$$

where:

m is related to the Avalanche Multiplication Factor (M) through the equation:

$$M = \frac{1}{1 - \left|\frac{VCB}{BV_{CBO}}\right|^m} \qquad (5.5)$$

where VCB=applied voltage, $BV_{CBO}$ is the breakdown voltage with the base open, and m is an empirically derived value between 2 and 6 (about 3 for silicon).

The discussion to this point has indicated that devices that are scaled below emitter areas of about 20 um μm² and certainly below emitter areas of about 10 μm² do not exhibit the behavior expected from current device models, particularly equation (1). The relationship between certain scaled dimensions, in particular emitter to STI spacing (e.g., D1 and D2 of FIGS. 1, 2 and 3 are now discussed.

Thus if equation (1) is used to design scaled (i.e., layout reduced in size from an earlier design) single or multi-emitter bipolar transistors the actual device parameters of Ic and those parameters dependent on Ic (e.g., $\beta$) of the fabricated scaled single or multi-emitter bipolar transistor will be different than expected. If single or multi-emitter bipolar transistors scaled to equation (1) are used in a circuit design, the simulation of the circuit containing the scaled single or multi-emitter bipolar transistors, the simulation results will be different from that of the fabricated circuit.

Figure 9A:
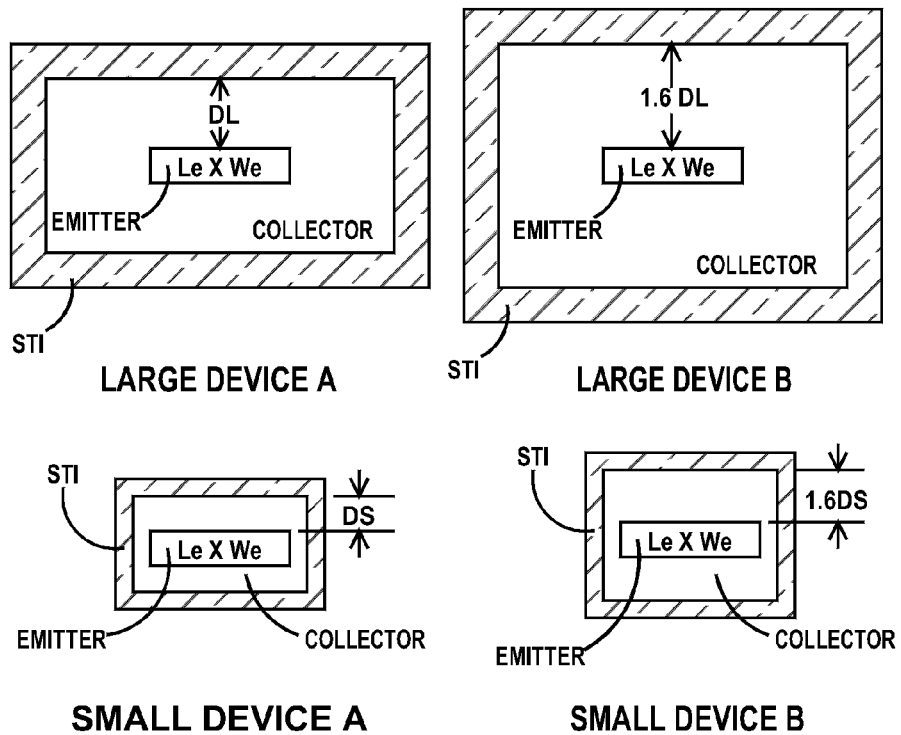
FIG. 9A includes plan views illustrating bipolar transistor scaling.

FIG. 9A includes plan views illustrating bipolar transistor scaling. Four device layouts are illustrated in FIG. 9A, a large device A, a small device A, a large device B and a small device B. Small device A was generated by reducing all collector and emitter dimensions of large device A. Small device B was generated by reducing all collector and emitter dimensions of large device B. The only difference between large device A and large device B is the distance between the emitter and STI in the widthwise direction which is a distance DL in large device A and a distance 1.6 times DL in large device B. The only difference between small device A and small device B is the distance between the emitter and STI which is a distance DS in small device A and a distance 1.6 times DS in small device B. Devices similar to those of FIG. 9A (except having three emitters as in FIG. 5A were fabricated and the results plotted in FIG. 9B.

Figure 9B:
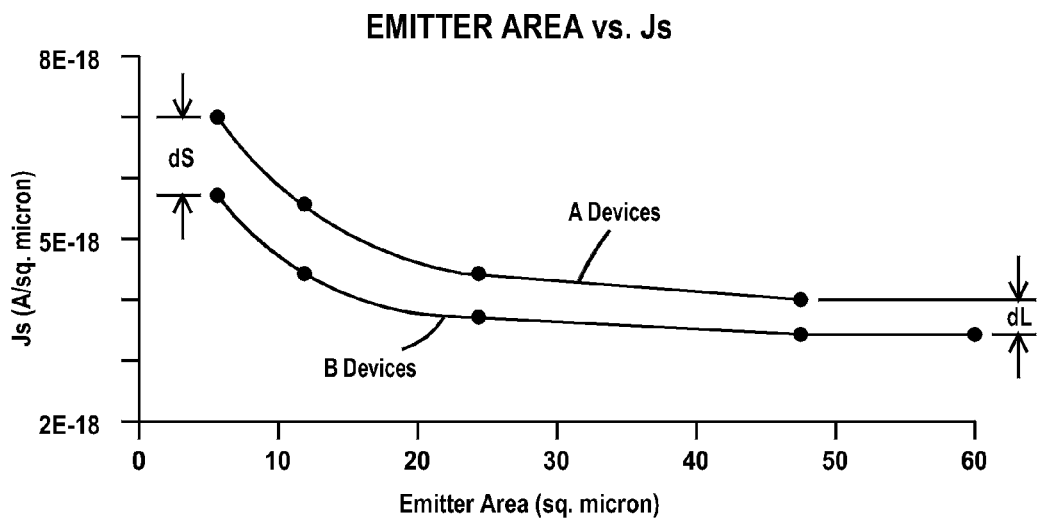
FIG. 9B is a plot of measured values of collector current density at saturation vs. emitter area for physical bipolar transistors scaled as shown in FIG. 9A.

FIG. 9B is a plot of measured values of collector current density at saturation vs. emitter area for physical bipolar transistors small as shown in FIG. 9A. For the A device curve, devices (normalized to X) having We=0.16X, Le=0.4X um, X um, 2X um and 4X um and n=3 are plotted. For the B device curve, devices having We=0.16X, Le=0.4X um, X um, 2X um. 4X um and 5X um and n=3 are plotted. The emitter to STI spacing for B devices was 1.6 times that for A devices. FIG. 9B shows, comparing A and B devices with the same emitter areas that Js decreases with increasing emitter to STI spacing. Additionally, FIG. 9B shows that the difference in Js (dS) between small A and B devices having the same emitter area is greater than the difference in Js (dL) between large devices having the same emitter area. Thus, simply changing the emitter to STI spacing will change Js. The plots of FIG. 9B can be explained by stress induced into the collector by the STI with small devices experiencing higher stress from the STI than the larger devices.

Figure 10A:
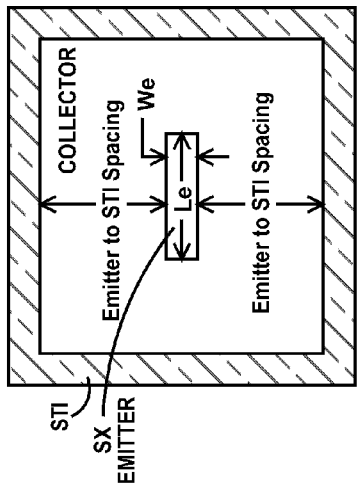
FIGS. 10A and 10B illustrate the effect of emitter to shallow trench isolation spacing in the lengthwise direction on collector current density at saturation.
Figure 10B:
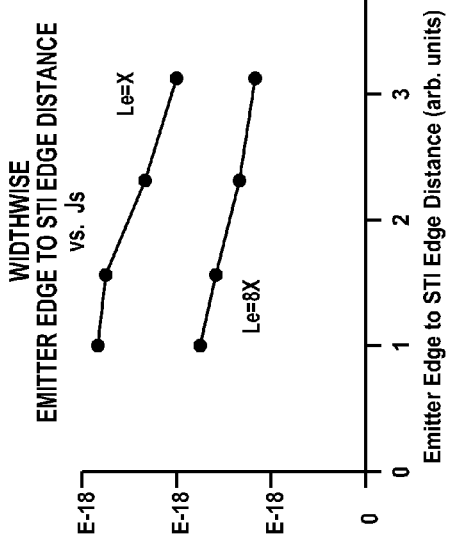

FIGS. 10A and 10B illustrate the effect of emitter to shallow trench isolation spacing in the lengthwise direction on collector current density at saturation. FIG. 10A illustrates the emitter to STI distance plotted on the X-axis of FIG. 10B. In FIG. 10B, a first curve for Le=X um and a second curve for Le=8X um (both for the same value of We) are plotted for various emitter to STI distances in the lengthwise direction. It can be seen that Js for small devices (Le=X um curve) is a very strong function of emitter to STI distance and for any emitter to STI distance small devices (Le=X um curve) are affected more than large devices (Le=8X um curve).

Figure 11A:
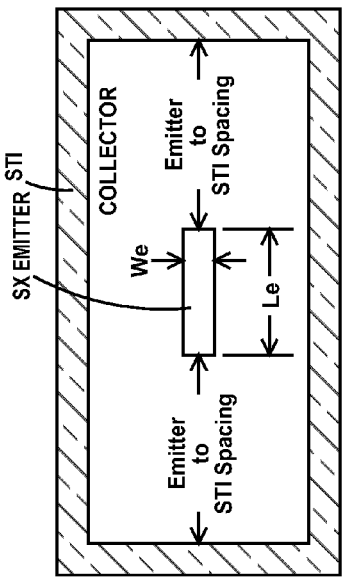
FIGS. 11A and 11B illustrate the effect of emitter to shallow trench isolation spacing in the widthwise direction on collector current density at saturation.
Figure 11B:
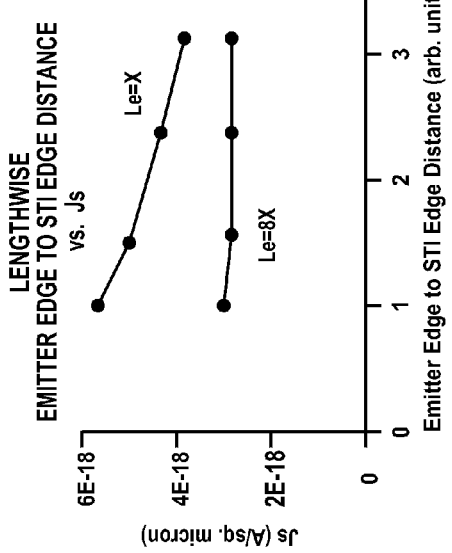

FIGS. 11A and 11B illustrate the effect of emitter to shallow trench isolation spacing in the widthwise direction on collector current density at saturation. FIG. 11A illustrates the emitter to STI distance plotted on the X-axis of FIG. 11B. In FIG. 11B, a first curve for Le=X um and a second curve for Le=8X um (both for the same value of We) are plotted for various emitter to STI distances in the lengthwise direction. It can be seen that Js for large and small devices (Le=X um curve) is a very strong function of emitter to STI distance and for any emitter to STI distance small devices (Le=X um curve) are affected more than large devices (Le=8X um curve).

The results seen in FIGS. 4, 6, 7 and 8 are caused by stress induced into the collector by the STI. FIG. 7, in particular indicates that the variation of collector current is a stronger function of stress than of base current. The relationship between STI to emitter distance on Js (and thus Ic) as shown in FIGS. 9B, 10A, 10B, 11A and 11B is an unexpected result because the emitter and collector are defined by separate design levels, fabricated with different masks, and are formed in two different layers of the device (the collector level and the emitter level, with the base intervening).

The deviation of scaled devices from standard model and the relationship between emitter to STI spacing has been discussed. Two approaches to the scaling problem can be taken. In a first approach, new compact models may be developed to increase simulation accuracy. In a second approach, changes to the device scaling rules may be applied so the scaled devices adhere to the standard model of equation (1). New methods of modeling the bipolar transistors using emitter and STI/collector geometry are now discussed.

Equation (6) may be used to calculate the stress induced in the collector of a bipolar transistor:

$$\Delta Vbe = kT \ln\left(\frac{Js(x)}{Js(0)}\right) \quad (6)$$

where:

$\Delta Vbe$ is the change in base-emitter voltage;
$Js(X)$ is the collector saturation current under stress; and
$Js(0)$ is the collector saturation current without stress.

When $\Delta Vbe$ is positive, the collector is under compressive stress, which means for an NPN bipolar transistor, the mobility of the majority carriers is reduced. Given that the sensitivity of Vbe to hydrostatic pressure in silicon is 1.5E-11 V/Pa, the stress induced in the collectors of the smallest device studied (emitter area=about 5 um$^2$) is in the order of about 1 GPa.

Figure 12:
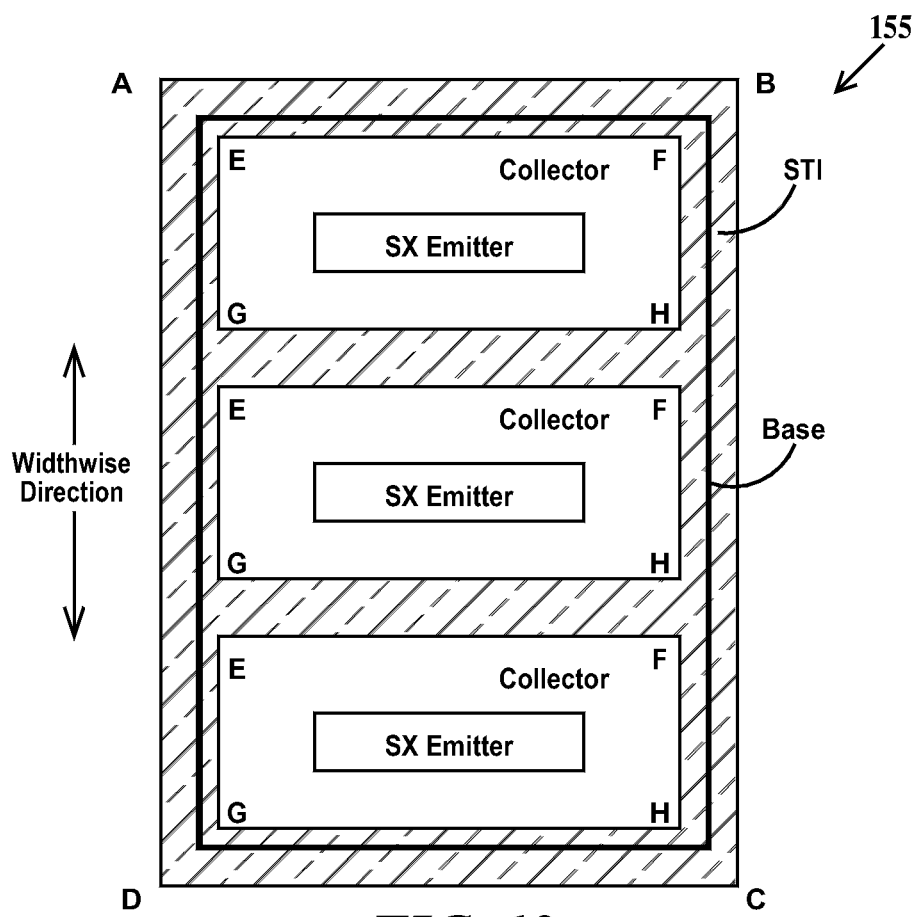
FIG. 12 is a plan view of a bipolar transistor illustrating geometrical features used for calculating stress induced in the collector by shallow trench isolation according to embodiments of the present invention.

FIG. 12 is a plan view of a bipolar transistor illustrating geometrical features used for calculating stress induced in the collector by shallow trench isolation according to embodiments of the present invention. In FIG. 12 the area of the total device is defined by vertices A, B, C, and D and given by the area $\overline{ABCD}$. The area of each collector is defined by the vertices E, F, G and H with each collector having an area $\overline{EFGH}$ and the total silicon area is 3 times $\overline{EFGH}$. From the discussion supra with respect to equation (6) and FIG. 12 a stress factor can be defined by equation (7):

$$StressFactor \propto \frac{\overline{ABCD} - n*\overline{EFGH}}{n*\overline{EFGH}} \quad (7)$$

where n is the number of emitters.

Figure 13:
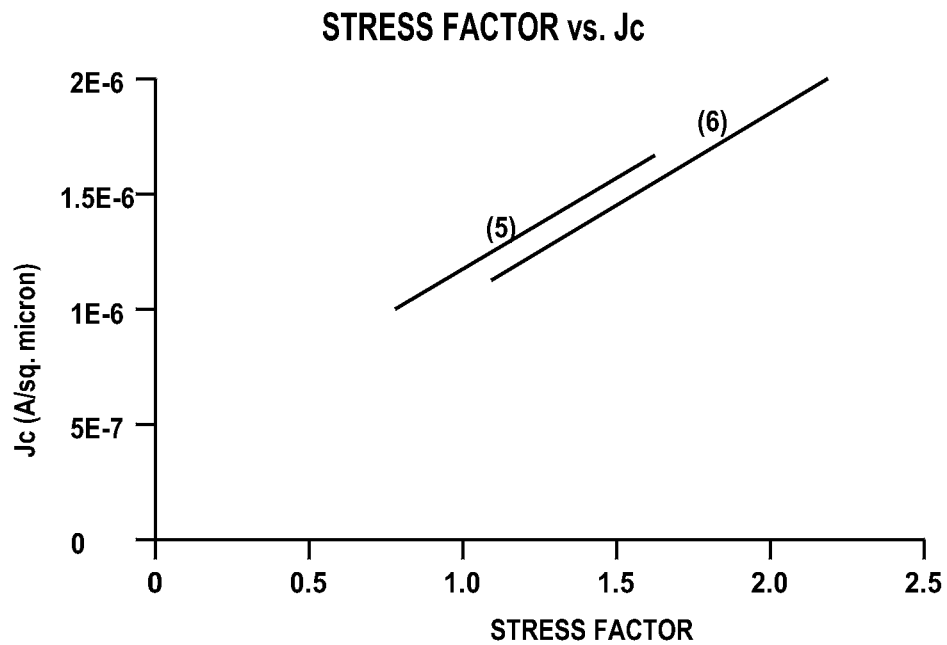
FIG. 13 is a plot of collector current density as a function of collector stress factors for physical bipolar transistors according to embodiments of the present invention.

FIG. 13 is a plot of collector current density as a function of collector stress factors for physical bipolar transistors according to embodiments of the present invention. In FIG. 13, curve (5) is for the devices similar to those of the "A Device curve" of FIG. 9B and curve (6) is for devices similar to those of the "B Device" curve of FIG. 9B. The emitter to STI distance for devices of curve 5 is about 60% less than the corresponding emitter to STI distances for devices of curve 6. For the smaller devices there is an additional amount of stress of about 0.06 GPa.

Thus, a first compact model that adjusts a standard model (e.g., equation (1)) value of Ic based on stress parameter generated by the stress algorithm of equation (7) may be developed. The input to the algorithm are the layout parameters of the dimensions of the outer perimeter of the STI, the dimensions of the collector(s) and the number of emitters. The input to the standard model are the layout parameters of the area and perimeter of the emitter(s).

Figure 14:
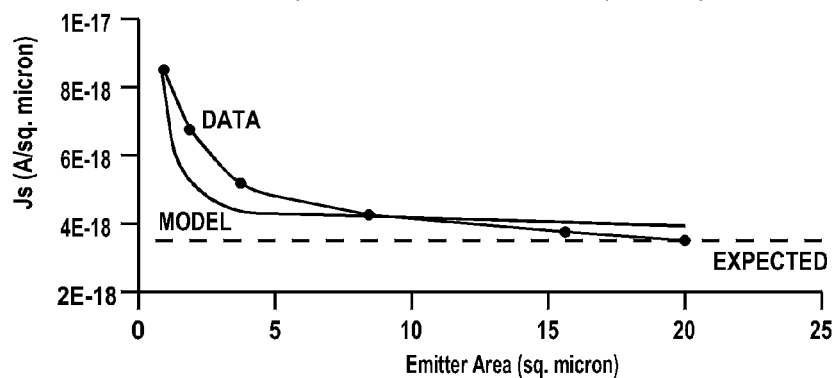
FIG. 14 is a plot of collector current density at saturation as a function of emitter area for physical bipolar transistors according to embodiments of the present invention.

FIG. 14 is a plot of collector current density at saturation as a function of emitter area for physical bipolar transistors according to embodiments of the present invention. In FIG. 14 there is a "Data" curve based on measurements of physical bipolar transistors and a "Model" curve based on the equation (8) for Ic in an NPN bipolar transistor:

$$Ic = \frac{kT \cdot A \cdot \mu_n \cdot n_i^2}{\int_0^w N_A(x)dx} \exp\left(\frac{qV_{BE}}{kT}\right) \quad (8)$$

where:

$$n_i^2 = N_c N_v \exp\left(\frac{-Eg}{kT}\right) \quad (9)$$

A is the base area;
$\mu_n$ is the electron (minority carrier) mobility;
$n_i$ is the intrinsic carrier concentration;
Na is the acceptor concentration;
w is the width of the depletion region;
Nc is the effective density of states in the conduction band;

Nv is the effective density of states in the valance band;
Eg is the energy bandgap of the base;

$$Eg = \Delta Eg/Le \tag{10}$$

Le is emitter length; and
ΔEg is 24.5 meV-um (in this formulation, when the stress induced in collector is about 1 GPa).

FIG. 14 shows, while equation (8) is not a perfect fit for actual devices, it is a close approximation. and could serve as a second compact model of Ic based on the layout parameters of the dimensions of the base area and the emitter length and by including stress. FIG. 14 also includes a plot (dashed lines) of Js vs. emitter area expected by equation (1).

Figure 15:
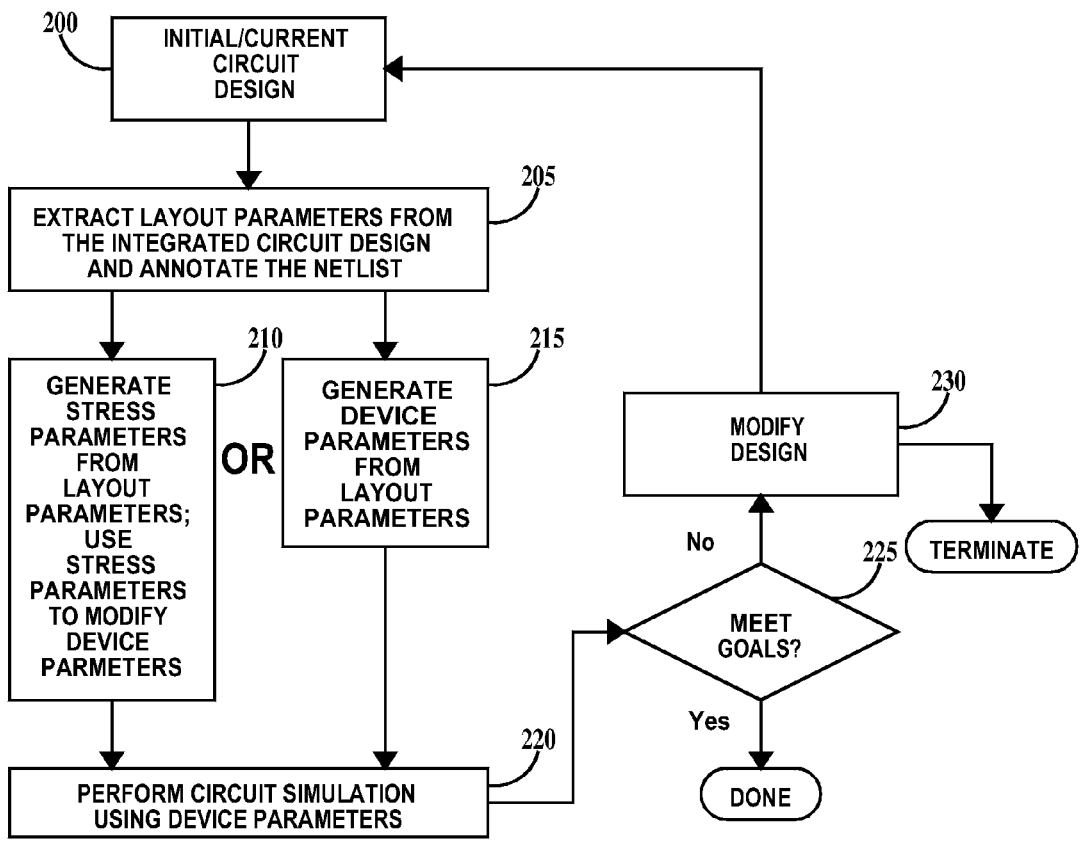
FIG. 15 is a flowchart illustrating a method of designing integrated circuits having bipolar transistors according to embodiments of the present invention.

FIG. 15 is a flowchart illustrating a method of designing integrated circuits having bipolar transistors according to embodiments of the present invention. In step 200, an initial circuit design is provided. An integrated circuit design is a representation of an integrated circuit in computer readable code. The circuit design may include, for example, graphical layout data of devices in the circuit. For a bipolar transistor, the design includes design levels that define the collector, base and emitter. In one example the representation of the integrated circuit is in a GL1 or GDSII format. GL1 (Graphics Language 1, developed by IBM Corporation) and GDSII (Graphic Data System version 2, developed by GE CALMA) refer to graphics languages that provide a standard file format for transferring and archiving 2D graphical design data in computer systems.

Then, in step 205, a netlist is extracted and annotated with layout parameters. A netlist describes the connectivity of an electronic design. Netlists refer to the elements of devices (e.g., collector, base, emitter of a bipolar transistor). Each time a device is used in a netlist it is called and instance. If the same device is used ten times there will be ten instances. If each of two different devices are used five and ten times there will be fifteen instances. Instances have pins that have names. Nets are wires that connect the pins together into a circuit. For example, when the device is a bipolar transistor, the pins include collector, base and emitter contacts.

Netlist extraction is the translation of an integrated circuit layout into a netlist. Different extraction programs generate different representation of the netlist depending upon the type of circuit simulation the netlist will be used for (e.g., static timing analysis, signal integrity, power analysis and optimization and logic to layout comparison. Both designed devices (devices deliberately created by the designer) and parasitic devices (devices not explicitly intended by the designer but are inherent in the layer of the circuit) may be extracted.

Next either step 210 or 215 is performed depending upon the collector current model to be used.

In step 210, the first compact model described supra is used. The device to silicon area stress algorithm of equation (7) is used to modify device parameters from the model of equation (1) in order to generate stress parameters. The inputs to equation (1) are the layout parameters of the dimensions of the emitter(s). The output of the equation (1) is Ic and/or β. The input to stress the algorithm are the layout parameters of the dimensions of the outer perimeter of the STI, the dimensions of the collector(s) and the number of emitters. The output of the stress algorithm is a stress factor. The output of the first compact model is a stressed collector current $Ic_{STRESSED}$ and/or $\beta_{STRESSED}$. The method proceeds to step 220.

In step 215, the second compact model described supra is applied directly to the to layout parameters to generate device parameters. The layout parameters the layout parameters of the dimensions of the collector and the emitter(s) length. The device parameters are Ic and/or β. The then proceeds to step 220.

In step 220, a circuit simulation is performed using device parameters generated by step 210 or 215. In step 225 it is determined if pre-determined circuit performance goals have been met based on the simulation results. An example of a performance goal is signal propagation speed through various circuits of the design. If in step 225, the performance goals have been met, then the method is complete, otherwise the method proceeds to step 230. In step 230 the circuit design is modified, for example, by modifying the bipolar transistor design(s) of the circuit and the method loops back to 200. Circuit layout modification in step 230 can be done manually or by an automated program. Step 230 includes an option to terminate the process after a certain number of automatic loops through steps 230, 200, 205, 210, 220 and 225 or through steps 230, 200, 205, 215, 220 and 225 or upon direction of a human operator. If the initial loop was through step 210 all subsequent loops are through step 210. If the initial loop was through step 215 all subsequent loops are through step 215.

The second approach to the problem of the deviation of scaled devices from the current stand model of equation (1) is now discussed.

Figure 16A:
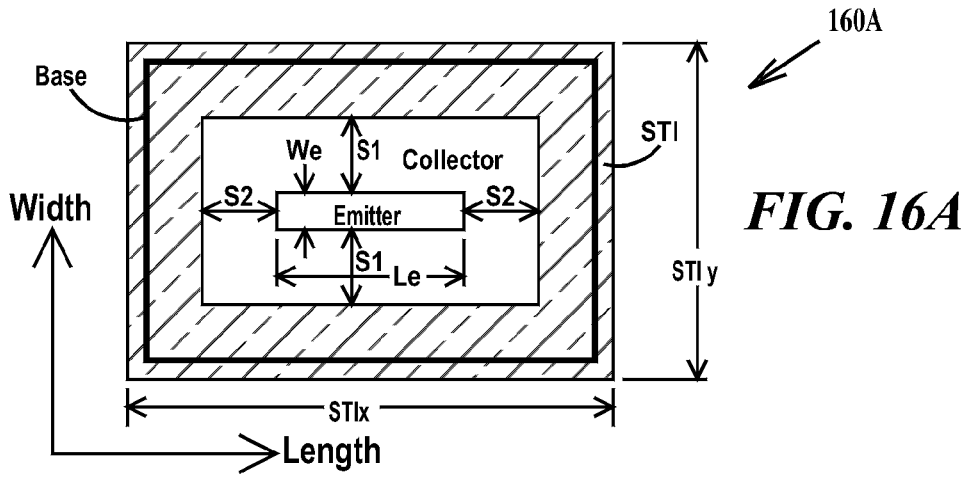
FIGS. 16A through 16E are plan views of bipolar transistors illustrating geometry based methods of collector stress relief according to embodiments of the present invention.

FIGS. 16A through 16E are plan views of bipolar transistors illustrating geometry based methods of collector stress relief according to embodiments of the present invention. In FIGS. 16A through 16E only the STI/collector, base and emitter levels are shown. The base is shown in heavy lines. The STI level is crosshatched for clarity. In FIG. 16A a normally scaled device 160A has an Le long by We wide emitter having emitter to STI spacings of S1 in the widthwise direction and S2 in the lengthwise direction. Assuming device 160A was scaled based on the standard model of equation (1) and the emitter area and perimeter are small enough so the actual Ic of device 160A is expected to be significantly higher than the standard model Ic value for device 160A due to STI stress as discussed supra, then adjustments to the design of device 160A may be made as illustrated in FIGS. 16B through 16F.

Figure 16B:
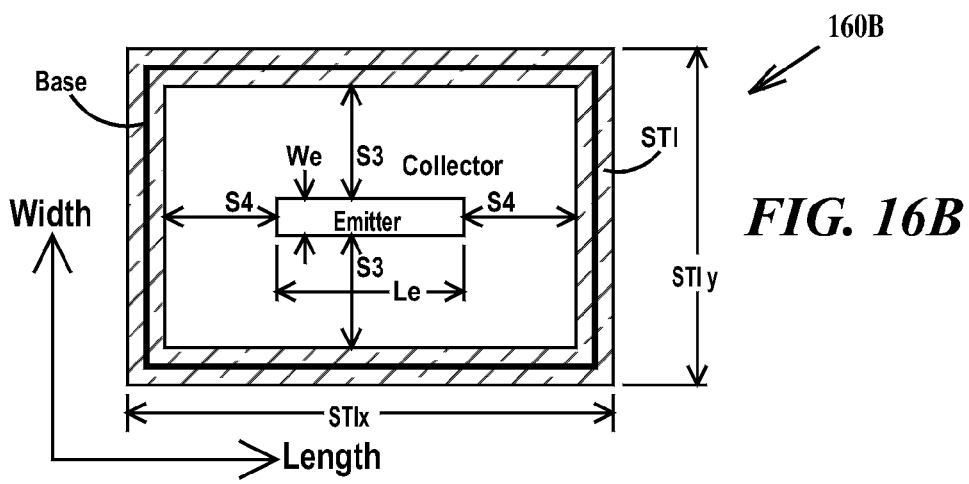

In FIG. 16B, a device 160B is the same as device 160A of FIG. 16A except device 160B been stress relieved by increasing the emitter to STI spacings in both the widthwise and lengthwise directions. Device 160B has an emitter to STI spacing of S3 in the widthwise direction and S4 in the lengthwise direction. S3 is greater than S1 (see FIG. 16A) and S4 is greater than S2 (see FIG. 16A).

Figure 16C:
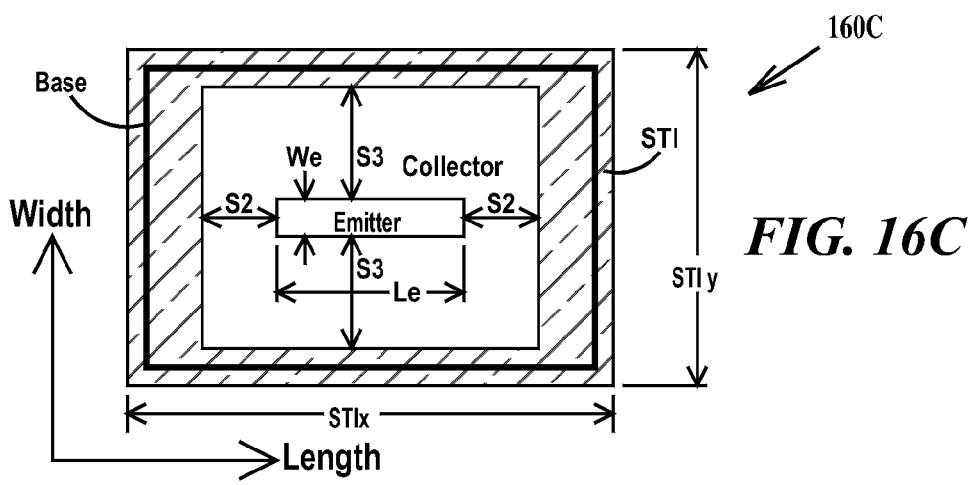

In FIG. 16C, a device 160C is the same as device 160A of FIG. 16A except device 160C been stress relieved by increasing the emitter to STI spacings in the widthwise direction. Device 160C has an emitter to STI spacing of S3 in the widthwise direction and S2 in the lengthwise direction.

Figure 16D:
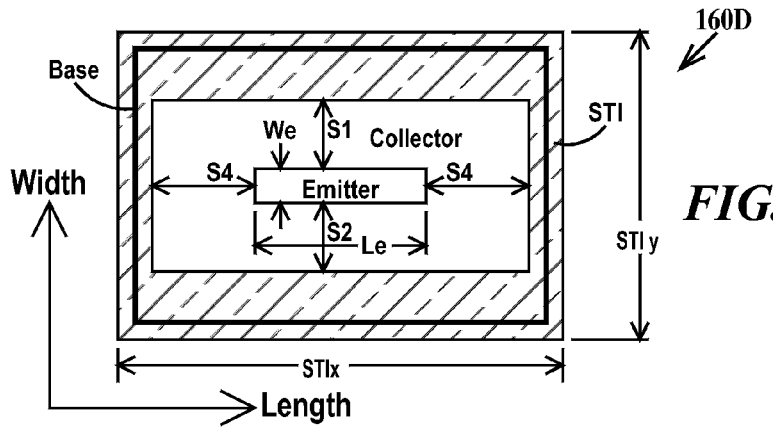

In FIG. 16D, a device 160D is the same as device 160A of FIG. 16A except device 160D been stress relieved by increasing the emitter to STI spacings in the lengthwise direction. Device 160D has an emitter to STI spacing of S1 in the widthwise direction and S4 in the lengthwise direction.

Figure 16E:
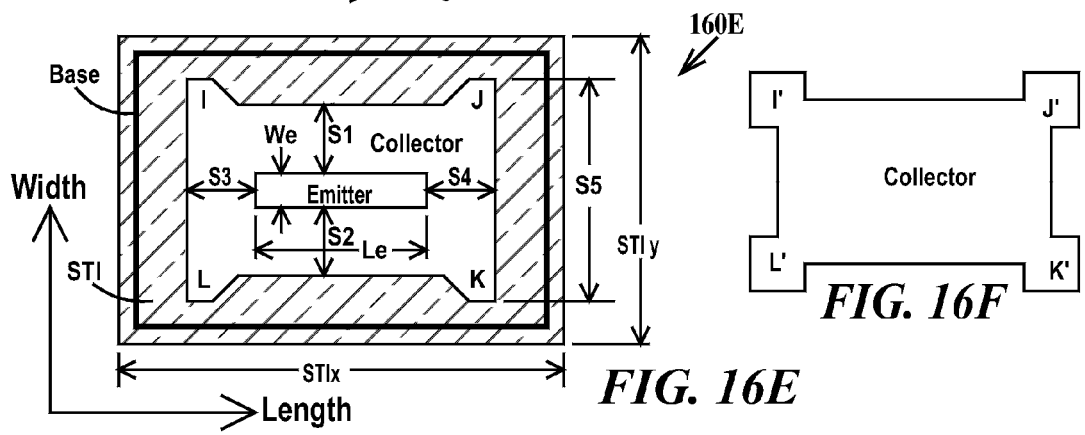

In FIG. 16E, a device 160E is the same as device 160A of FIG. 16A except device 160E been stress relieved by notching the inner vertices of the STI of device 160A so the collector of device 160E has a dog-bone shape in a plane defined by the widthwise and lengthwise directions (which are also parallel to a top surface of a substrate the actual device would be fabricated in). In FIG. 16E, the collector has a substantially rectangular body with projecting portions I, J, K and L projecting from the corners of the collector on two sides. In FIG.

16E, the collector has a length and a first width in a middle of the collector that is less than a second width of the collector at ends of the collector. Device 160A has an emitter to STI spacing of S1 in the widthwise direction and S2 in the lengthwise direction just as device 160A of FIG. 16A measured perpendicularly anywhere from the perimeter of the emitter to the edge of the STI. The width of the collector (in the widthwise direction) is S5 while the width of at least a portion of the region of the collector over which the emitter is aligned has a width (in the widthwise direction) of 2S1+We where S5 is greater than 2S1+We.

Figure 16F:
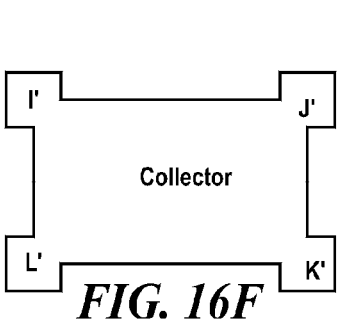
FIG. 16F is an alternate layout of the dog-bone shape collector of FIG. 16E.

FIG. 16F is an alternate layout of the dog-bone shape collector of FIG. 16E. In FIG. 16F projections I', J', K' and L' extending from all four sides of the collector instead of just two as in FIG. 16E. Dog-boning reduces stress induced in the collector by the STI because corners concentrate stress and dog-boning "removes" the corners.

Figure 17A:
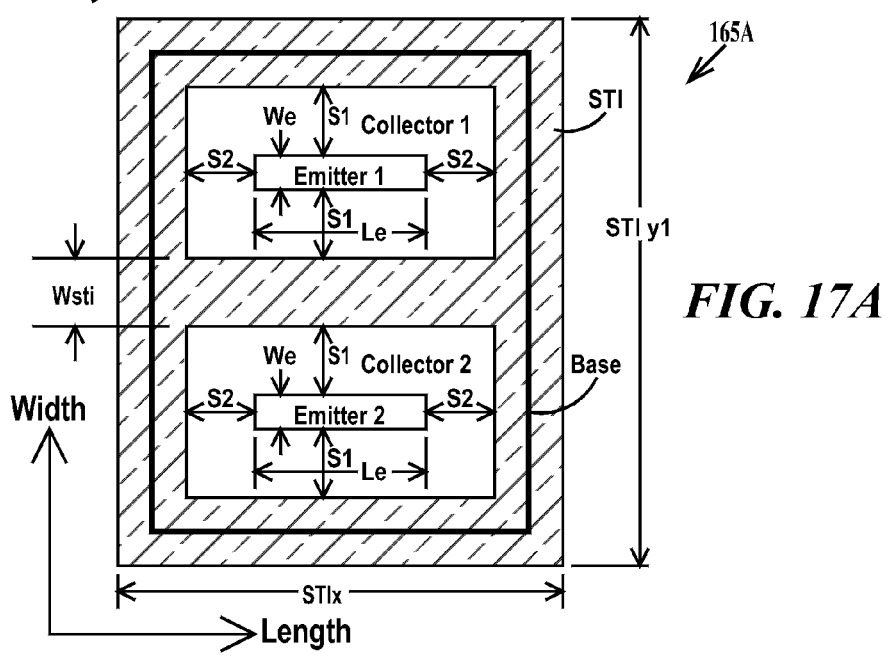
FIGS. 17A and 17B are plan views of multi-emitter bipolar transistors illustrating a geometry based method of collector stress relief according to embodiments of the present invention.
Figure 17B:
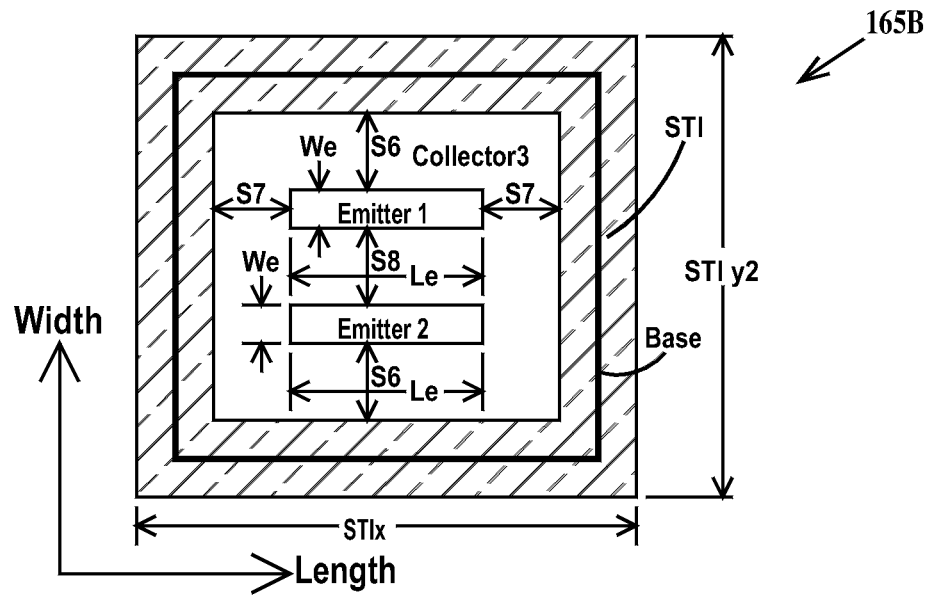

FIGS. 17A and 17B are plan views of multi-emitter bipolar transistors illustrating a geometry based method of collector stress relief according to embodiments of the present invention. In FIGS. 17A and 17B only the STI/collector, base and emitter levels are shown. The base is shown in heavy lines. The STI level is crosshatched for clarity. In FIG. 17A a normally scaled device 165A has two emitters, emitter 1 and emitter 2, each having a length Le and a width We and two collectors, collector 1 and collector 2, separated by a region of STI having a width Wsti. Over collector 1, the emitter 1 to STI spacing is S1 in the widthwise direction and S2 in the lengthwise direction. Over collector 2, the emitter 2 to STI spacing is S1 in the widthwise direction and S2 in the lengthwise direction. Assuming device 165A was scaled based on the standard model of equation (1) and the emitter 1 and emitter 2 areas and perimeters are small enough so the actual Ic of device 165A is expected to be significantly higher than standard model Ic value for device 165A due to STI stress as discussed supra, then adjustments to the design of device 165A may be made as illustrated in FIG. 17B.

In FIG. 17B, a device 165B is the same as device 165A of FIG. 17A except device 165B been stress relieved by eliminating the region of STI between emitter 1 and emitter 2 of device 165A to form a single collector 3. Device 165B has an emitter to STI spacing of S6 in the widthwise direction and S7 in the lengthwise direction and a spaced a distance S8 apart. In one example, S6 is equal to S1 and S7 is equal to S2 of device 165A of FIG. 17A. In one example, S8 is equal to Wsti (see FIG. 17A). In one example, S8 is equal to 2S1 (see FIG. 17A). In one example, S8 is equal to S1 (see FIG. 17A). Optionally the emitter-to-emitter spacing and/or the emitter to STI spacing in either or both of the lengthwise and widthwise directions may be adjusted as well.

Figure 18:
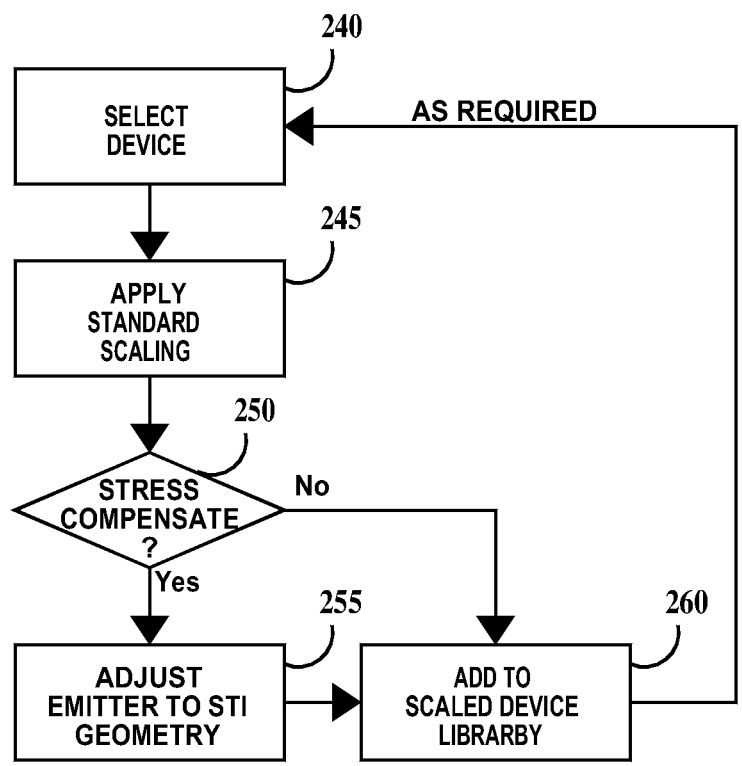
FIG. 18 is a flowchart of a method generating scaled devices according to embodiments of the present invention.

It should be understood that devices 160A, 160B, 160C, 160D, 160E, 165A and 165B of respective FIGS. 16A, 16B, 16C, 16D, 16E, 17A and 17B are illustrated with the respective emitters centered over the respective collectors. However, the respective emitters may not be centered over the respective collectors based on variations in transistor design library elements such as parameterized cells. A parameterized cell (Pcell) is a "cell" which is automatically generated by electronic design automation (EDA) software based on the value of its governing parameters. Emitters may be, for example, moved in the widthwise direction to be spaced closer to a first edge of two parallel collector edges than a second edge of the two of the parallel collector edges. Similarly, the emitter(s) may be moved in the lengthwise direction to be spaced closer to a first edge of two parallel collector edges than a second edge of the two of the parallel collector edges. Lastly, the emitter(s) may be shifted in both the lengthwise and widthwise directions. Devices 160A, 160B, 160C, 160D, 160E, 165A and 165B of respective FIGS. 16A, 16B, 16C, 16D, 16E, 17A and 17B represent methods of adjusting the layout geometry of a shallow trench isolation layout level (which also defines the collector) relative to the layout geometry of an emitter layout level of a scaled design of a bipolar transistor to generate a stress compensated scaled design of the bipolar transistor FIG. 18 is a flowchart of a method generating scaled devices according to embodiments of the present invention. In step 240 an initial device is selected to be scaled. In step 245, scaling is performed generate a smaller scaled device by reducing the dimensions of the initial device. In step 250, it is determined if STI stress adjustment of the scaled device is required based on emitter length, area, perimeter or a combination thereof. If no stress adjustment is required the method proceeds to step 260, otherwise the method proceeds to step 255. In step 255, the emitter to STI geometry of the scaled device is adjusted to generate a stress compensated scaled device by (i) adjusting the emitter to STI spacing in either or both of the lengthwise and widthwise directions, (ii) notching the STI adjacent to the corners of the collector to create a dog-bone shaped collector, or (iii) on multi-emitter devices having multiple collectors separated by STI (in the widthwise direction) eliminating the STI between adjacent collectors of the device and optionally adjusting the emitter to emitter spacing and/or the emitter to STI spacing in either or both of the lengthwise and widthwise directions. The selection of scaled devices to stress compensate may be performed manually or automatically. Next in step 260 either the stress compensated scaled device generated in step 260 or the scaled device generated in step 245 is added to a device library to be used in the design of integrated circuits. The method may loop back to step 240 to select another device to scale as often as required.

FIG. 19 is the similar to FIG. 3, but additional processing according to embodiments of the present invention has been performed to form a device 100A. In FIG. 19, portions of STI 110 have been removed isotropically, for example, by wet etching with dilute hydrofluoric acid, through a masking layer, for example a patterned photoresist layer, to remove some of STI 110 and optionally some of DTI 135. Alternatively, STI 110 may be removed to expose sidewalls 170 of collector 105. After removing the masking layer, a capping layer 175 is formed to form a void 180. Capping layer 175 seals but does not completely fill void 180. Device 100A is thus STI stress-compensated. In one example, capping layer 175 is borophosphosilicate glass (BPSG). Alternatively, STI 110 may be removed and the resultant void 180 filled with a non-stress inducing material, e.g., spin-on-glass or a porous dielectric.

FIG. 20 is a plan view of a bipolar transistor illustrating a masking layer for practicing step 255 of the method of FIG. 18. In FIG. 19 the STI/collector level (crosshatched), base level (heavy line), polysilicon emitter layer, and emitter layer are illustrated. The dashed line represents an opening in the masking layer overlapping the edge of the base and exposing a ring of STI. Note, while a ring shaped STI etch mask opening is illustrated in FIG. 20, the opening may comprise parallel openings extending in the lengthwise or widthwise directions so the STI is etched from only one pair (of the two orthogonal pairs of opposite sides that define the collector) of opposite sides of the collector. In other words, STI is removed from two opposing sides of the collector and not removed from the other two opposing sides of the collector.

FIG. 21 is a flowchart of a physical method of collector stress relief according to embodiments of the present invention. In step 265, the device is processed through the base etch (step 10 described supra). In step 270, a masking layer is photolithographically defined and the STI around the collector is etched to form a trench. In step 275, a capping layer is deposited to seal the trench and form a void. In step further processing, such a forming dielectric layers, contacts, inter-level dielectric layers and wires are performed to complete fabrication of an integrated circuit chip.

Generally, the methods described herein with respect to method of designing integrated circuits having bipolar transistors and designing bipolar transistors is practiced with a general-purpose computer and the methods described supra in the flow diagrams of FIGS. 15 and 18 may be coded as a set of instructions on removable or hard media for use by the general-purpose computer.

Figure 22:
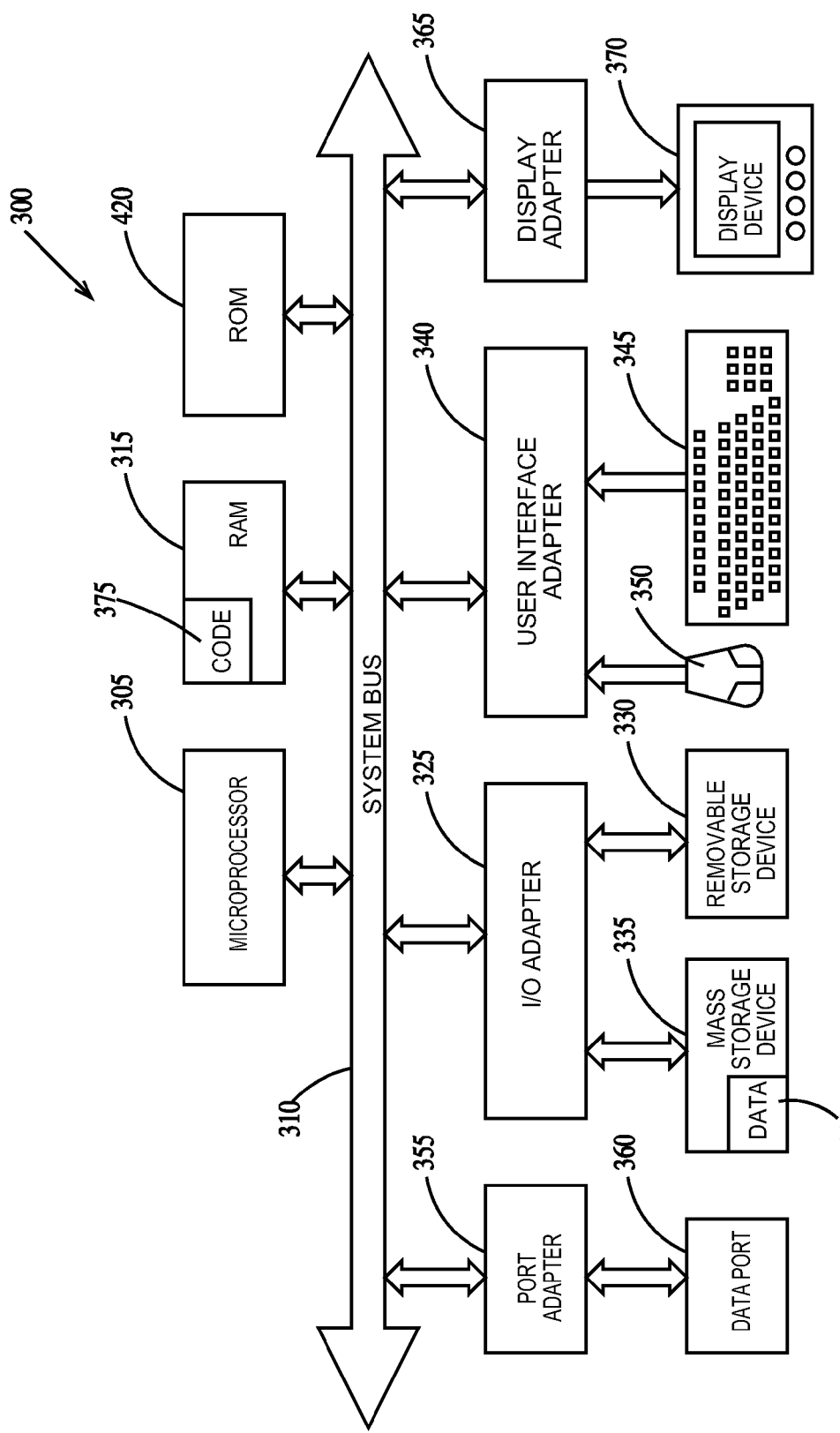
FIG. 22 is a schematic block diagram of a general-purpose computer that may be used for practicing embodiments of the present invention.

FIG. 22 is a schematic block diagram of a general-purpose computer used for practicing embodiments of the present invention. In FIG. 22, a computer system 300 has at least one microprocessor or central processing unit (CPU) 305. CPU 305 is interconnected via a system bus 310 to a random access memory (RAM) 315, a read-only memory (ROM) 320, an input/output (I/O) adapter 325 for a connecting a removable data and/or program storage device 330 and a mass data and/or program storage device 335, a user interface adapter 340 for connecting a keyboard 345 and a mouse 350, a port adapter 355 for connecting a data port 360 and a display adapter 365 for connecting a display device 370.

ROM 320 contains the basic operating system for computer system 300. The operating system may alternatively reside in RAM 315 or elsewhere as is known in the art. Examples of removable data and/or program storage device 330 include magnetic media such as floppy drives and tape drives and optical media such as CD ROM drives. Examples of mass data and/or program storage device 335 include electronic, magnetic, optical, electromagnetic, infrared, and semiconductor devices. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. In addition to keyboard 345 and mouse 350, other user input devices such as trackballs, writing tablets, pressure pads, microphones, light pens and position-sensing screen displays may be connected to user interface 340. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 330, fed through data port 360 or typed in using keyboard 345.

Thus, the embodiments of the present invention provide methods of modeling stress in bipolar transistors, methods and structures for reducing stress in bipolar transistors, methods of fabricating bipolar transistors, and methods of designing integrated circuits having bipolar transistors and for designing bipolar transistors.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A method, comprising:
   forming a trench in substrate, and filling said trench with dielectric material to form trench isolation surrounding and abutting a perimeter of a collector in said substrate;
   forming a base on said collector;
   forming an emitter in said base;
   removing all or a portion of said dielectric material from said trench; and
   forming a dielectric capping layer on exposed regions of said substrate, said base and said emitter and over said trench, said capping layer sealing an upper region of said trench and forming a void around said perimeter of said collector.

2. The method of claim 1, wherein:
   said base overlaps said trench isolation and a perimeter of said trench isolation is exposed; and
   said removing all or a portion of said dielectric material from said trench includes:
      forming a masking layer over said substrate;
      forming an opening in said masking layer, a region of said trench isolation exposed in said opening; and
   isotropically etching said dielectric material.

3. The method of claim 1, wherein said forming said base includes:
   forming a polysilicon layer on said collector, said polysilicon layer overlapping said trench isolation to form a polysilicon base region on said dielectric material and a single crystal base region on said collector;
   forming an extrinsic polysilicon base region from said polysilicon base region and forming a single crystal extrinsic base region surrounding a single crystal intrinsic base region.

4. The method of claim 1, wherein said forming said emitter includes:
   forming dielectric layer on said base and over said collector;
   forming a trench in said dielectric layer aligned over said collector, said intrinsic base region exposed a bottom of said trench; and
   forming a doped polysilicon layer on said intrinsic base region in said trench and overlapping said dielectric layer to form a polysilicon emitter layer on said dielectric layer and a single crystal emitter in said intrinsic base region.

5. The method of claim 1, wherein said base includes germanium.

6. The method of claim 1, wherein said base overlaps said trench

7. The method of claim 1, wherein said collector has a length and a first width in a middle of said collector that is less than a second width of said collector at ends of said collector.

8. The method of claim 1, wherein said collector comprises a substantially rectangular body and projecting portions extending from corners of said body.

9. The method of claim 1, wherein:
   said emitter has a pair of opposite first sides defining a width of said emitter and extending in a widthwise direction and a pair of opposite second sides defining a length of said emitter extending in a lengthwise direction, said widthwise direction perpendicular to said lengthwise direction, said length of said emitter greater than said width of said emitter;

said collector has a pair of opposite third sides extending in said widthwise direction and a pair of opposite fourth sides extending in said lengthwise direction; and said collector has a first width measured along said third sides of said collector that is greater than a second width of said collector measured between said fourth sides of said collector in a region of said collector between said third sides.

10. The method of claim 1, wherein said dielectric layer overlaps only said single crystal intrinsic base region and said single crystal intrinsic base region.

11. The method of claim 1, wherein said extrinsic polysilicon base abuts a top surface of said dielectric filled trench.

12. The method of claim 1, wherein and said single crystal extrinsic base abuts a sidewall of said dielectric filled trench.

13. The method of claim 1, further including:
forming a subcollector in said substrate, said subcollector extending under said dielectric filled trench and said collector and abutting said collector.

14. The method of claim 13, further including:
forming a collector contact extending from a top surface of said substrate through said dielectric filled trench to said subcollector.

15. The method of claim 13, further including:
forming an additional dielectric filled trench surrounding and abutting a perimeter of said subcollector collector and extending deeper into said substrate than said subcollector.

16. The method of claim 1, wherein said dielectric filled trench filled electrically isolates said collector contact from said collector.

* * * * *